United States Patent
Hashimoto et al.

(10) Patent No.: US 10,053,607 B2
(45) Date of Patent: *Aug. 21, 2018

(54) WORKING FLUID FOR HEAT CYCLE

(71) Applicant: ASAHI GLASS COMPANY, LIMITED, Tokyo (JP)

(72) Inventors: Mai Hashimoto, Tokyo (JP); Masato Fukushima, Tokyo (JP); Satoshi Kawaguchi, Tokyo (JP); Tomoaki Taniguchi, Tokyo (JP); Yu Takeuchi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 14/850,035

(22) Filed: Sep. 10, 2015

(65) Prior Publication Data

US 2015/0376486 A1    Dec. 31, 2015

Related U.S. Application Data

(63) Continuation of application No. PCT/JP2014/061767, filed on Apr. 25, 2014.

(30) Foreign Application Priority Data

Apr. 30, 2013   (JP) ................................ 2013-095491
Feb. 20, 2014   (JP) ................................ 2014-030855

(51) Int. Cl.
*C09K 5/04*  (2006.01)

(52) U.S. Cl.
CPC ........ *C09K 5/045* (2013.01); *C09K 2205/122* (2013.01); *C09K 2205/126* (2013.01); *C09K 2205/22* (2013.01)

(58) Field of Classification Search
CPC .... C09K 2205/122; C09K 5/04; C09K 5/044; C09K 5/045

USPC .............................................. 252/67, 68, 69
See application file for complete search history.

(56) References Cited

U.S. PATENT DOCUMENTS

| | | | |
|---|---|---|---|
| 9,593,274 B2 * | 3/2017 | Fukushima | C09K 5/044 |
| 2010/0090156 A1 | 4/2010 | Nappa et al. | |
| 2010/0191024 A1 | 7/2010 | Uenveren et al. | |
| 2014/0077122 A1 * | 3/2014 | Fukushima | C09K 5/044 |
| | | | 252/67 |
| 2016/0002518 A1 * | 1/2016 | Taniguchi | C09K 5/044 |
| | | | 252/67 |
| 2016/0195321 A1 * | 7/2016 | Low | C09K 3/30 |
| | | | 62/77 |
| 2016/0340565 A1 * | 11/2016 | Tasaka | C09K 5/045 |
| 2017/0101567 A1 * | 4/2017 | Fukushima | C09K 5/044 |

FOREIGN PATENT DOCUMENTS

| JP | 2010-533151 | 10/2010 | |
|---|---|---|---|
| WO | WO 2012/157762 | 11/2012 | |
| WO | WO 2012/157764 | 11/2012 | |
| WO | WO 2012157763 A1 * | 11/2012 | ............. C09K 5/044 |

OTHER PUBLICATIONS

International Search Report dated Aug. 12, 2014, in PCT/JP2014/061767 filed Apr. 25, 2014.

* cited by examiner

*Primary Examiner* — Douglas J McGinty
(74) *Attorney, Agent, or Firm* — Oblon, McClelland, Maier & Neustadt, L.L.P.

(57) ABSTRACT

A working fluid for heat cycle, which has less influence over the ozone layer, has less influence over global warming, and has favorable cycle performance, is provided. The working fluid contains trifluoroethylene and difluoroethylene and the proportion of the difluoroethylene is less than 1.5 mass % based on the working fluid.

10 Claims, 1 Drawing Sheet

WORKING FLUID FOR HEAT CYCLE

TECHNICAL FIELD

The present invention relates to a working fluid for heat cycle.

BACKGROUND ART

Heretofore, as a working fluid for heat cycle such as a refrigerant for a refrigerator, a refrigerant for air-conditioning equipment, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane (CFC-13) or dichlorodifluoromethane (CFC-12), or a hydrochlorofluorocarbon (HCFC) such as chlorodifluoromethane (HCFC-22) has been used. However, influences of CFCs and HCFCs over the ozone layer in the stratosphere have been pointed out, and their use is regulated at present.

In this specification, abbreviated names of halogenated hydrocarbon compounds are described in brackets after the compound names, and in this specification, the abbreviated names are employed instead of the compound names as the case requires.

Under the above conditions, as a working fluid for heat cycle, a hydrofluorocarbon (HFC) which has less influence over the ozone layer, such as difluoromethane (HFC-32), tetrafluoroethane (HFC-134) or pentafluoroethane (HFC-125), has been used instead of CFCs and HCFCs. For example, R410A (a pseudoazeotropic mixture refrigerant of HFC-32 and HFC-125 in a mass ratio of 1:1) is a refrigerant which has been widely used. However, it has been pointed out that HFCs may cause global warming. Accordingly, development of a working fluid for heat cycle which has less influence over the ozone layer and has a low global warming potential (GWP) is an urgent need.

In recent years, as a working fluid for heat cycle which has less influence over the ozone layer and has less influence over global warming, a hydrofluoroolefin (HFO) having a carbon-carbon double bond which is easily decomposed by OH radicals in the air has been expected. In this specification, a saturated HFC is represented as a HFC and is distinguished from a HFO having a carbon-carbon double bond unless otherwise specified.

As a working fluid using a HFO, for example, Patent Document 1 discloses a composition containing trifluoroethylene (HFO-1123). Patent Document 1 discloses use of HFO-1123 with various HFCs or HFOs in combination for the purpose of increasing the flame retardancy, the cycle performance, etc. of the working fluid.

As mentioned above, a working fluid containing HFO-1123, which is excellent in the cycle performance, has been desired.

HFO-1123 is produced by various processes, and impurities are present in the formed product by any production process. And, if such HFO-1123 containing impurities (hereinafter sometimes referred to as crude HFO-1123) is used as it is, a working fluid excellent in the cycle performance may not be obtained in some cases.

Accordingly, to use HFO-1123 for a working fluid, a step of reducing impurities from the crude HFO-1123 is essential.

PRIOR ART DOCUMENT

Patent Document

Patent Document 1: WO2012/157764

DISCLOSURE OF INVENTION

Technical Problem

The object of the present invention is to provide a working fluid for heat cycle which has less influence over the ozone layer and has less influence over global warming, which is excellent in cycle performance, and which can be produced with high productivity. Further, the present invention is to simplify a step of reducing impurities from crude HFO-1123.

Solution to Problem

The present inventors have conducted extensive studies and as a result, found that the above object can be achieved by using a working fluid containing HFO-1123 and having a low content of difluoroethylene, and accomplished the present invention. Further, they have found, as a working fluid which achieves the above object, a working fluid containing HFO-1123 and HFC-32 and having a low content of difluoroethylene, and a working fluid containing HFO-1123 and 2,3,3,3-tetrafluoropropene (HFO-1234yf) and having a low content of difluoroethylene.

That is, the present invention provides a working fluid for heat cycle, which contains HFO-1123 and difluoroethylene, in a proportion of the difluoroethylene of less than 1.5 mass % based on the total amount of the working fluid.

The present invention further provides a working fluid for heat cycle, which contains trifluoroethylene, difluoroethylene and difluoromethane, wherein the proportion of the difluoroethylene is less than 1.5 mass % based on the total amount of the working fluid, and the total proportion of trifluoroethylene and difluoromethane is at least 80 mass % based on the total amount of the working fluid.

The present invention further provides a working fluid for heat cycle, which contains trifluoroethylene, difluoroethylene and 2,3,3,3-tetrafluoropropene, wherein the proportion of the difluoroethylene is less than 1.5 mass % based on the total amount of the working fluid, and the total proportion of trifluoroethylene and 2,3,3,3-tetrafluoropropene is at least 70 mass % based on the total amount of the working fluid.

The present invention still further provides a working fluid for heat cycle, which contains trifluoroethylene, difluoroethylene, difluoromethane and 2,3,3,3-tetrafluoropropene, wherein the proportion of the difluoroethylene is less than 1.5 mass % based on the total amount of the working fluid.

Advantageous Effects of Invention

The working fluid for heat cycle of the present invention (hereinafter sometimes referred to as a working fluid) has less influence over the ozone layer and has less influence over global warming. Further, the working fluid for heat cycle is excellent in cycle performance, since the content of difluoroethylene present as impurities in production of HFO-1123 is reduced to be less than 1.5 mass % based on the total amount of the working fluid.

DESCRIPTION OF EMBODIMENTS

<Working Fluid>

Figure 1:
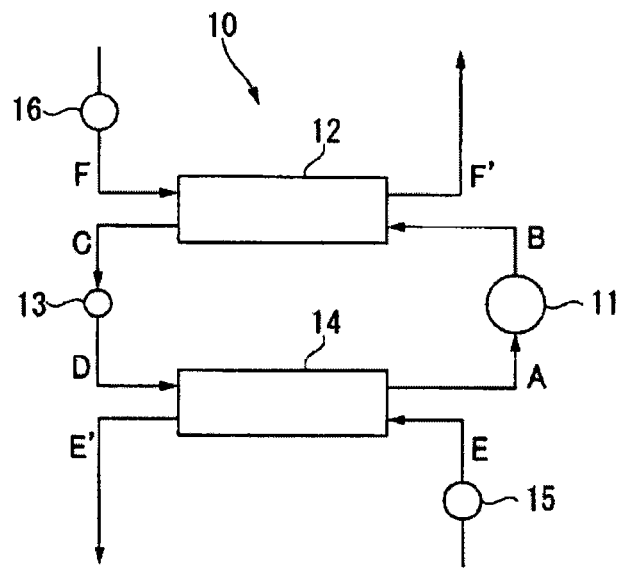
FIG. 1 is a schematic construction view illustrating a refrigerating cycle system to be used to measure cycle performance of a working fluid in Examples of the present invention.

The working fluid according to an embodiment of the present invention contains HFO-1123 and difluoroethylene, wherein the proportion of the difluoroethylene is less than 1.5 mass % based on the total amount of the working fluid.

The working fluid according to this embodiment may further contain a compound described hereinafter, in addition to HFO-1123 and difluoroethylene.
<HFO-1123>

HFO-1123 has a low global warming potential (GWP), has less influence over the ozone layer and has less influence over global warming. Further, HFO-1123 is excellent in the performance as the working fluid and is particularly excellent in cycle performance (for example, a coefficient of performance and refrigerating capacity obtained by the after-mentioned method).

The content of HFO-1123 is preferably at least 20 mass %, more preferably at least 30 mass %, further preferably at least 40 mass % based on the entire amount (100 mass %) of the working fluid, in view of cycle performance.

HFO-1123 is known to decompose when used by itself at high temperature or with an ignition source under high pressure, that is, to be self-decomposable. With a view to preventing self-decomposition reaction of HFO-1123, the content of HFO-1123 is preferably at most 80 mass %, more preferably at most 70 mass %, most preferably at most 60 mass %, based on the total amount of the working fluid.

With respect to the working fluid of the present invention, the self-decomposition reaction may be suppressed by lowering the content of HFO-1123 by mixing HFO-1123 with the after-mentioned HFC-32 or the like. When the content of HFO-1123 is at most 80 mass %, HFO-1123 is not self-decomposable under temperature and pressure conditions under which it is applied to a heat cycle system, and thus a working fluid with high safety will be obtained.
<Difluoroethylene>

Difluoroethylene is a compound which forms in production of HFO-1123 as a by-product and is present as an impurity in the formed composition. The difluoroethylene may be 1,1-difluoroethylene (HFO-1132a) and E- and/or Z-1,2-difluoroethylene (HFO-1132). E- and/or Z-means a mixture of an E-form and a Z-form and is also represented as E/Z-.

The amount of the difluoroethylene in the present invention means the total amount of HFO-1132a and HFO-1132, and for the working fluid of the present invention, particularly the amount of HFO-1132a which is likely to form as a by-product in production of HFO-1123 and is likely to remain as an impurity in the formed composition, is preferably small.

If the working fluid contains the difluoroethylene, its cycle performance tends to be low. However, when the content of the difluoroethylene is less than 1.5 mass % based on the total amount of the working fluid, a working fluid having a sufficiently excellent cycle performance will be obtained.

Further, the content of the difluoroethylene is preferably at least 4 ppm, more preferably at least 50 ppm, most preferably at least 100 ppm, based on the total amount of the working fluid. When the content is at least 4 ppm, a step of purifying the crude HFO-1123 to reduce the difluoroethylene as an impurity can be simplified.
<HFC and/or HFO>

The working fluid of the present invention may further contain a hydrofluorocarbon (HFC) and another hydrofluoroolefin (HFO) in addition to HFO-1123 and the difluoroethylene.

In view of less influence over the ozone layer and excellent cycle performance, the HFC may, for example, be difluoromethane (HFC-32), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) and pentafluoroethane (HFC-125). Such HFCs may be used alone or in combination of two or more. Among them, HFC-32 is particularly preferred.

In view of less influence over the ozone layer and excellent cycle performance, another HFO may, for example, be 2,3,3,3-tetrafluoropropene (HFO-1234yf), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-12434. Such HFCs may be used alone or in combination of two or more. Among them, preferred is HFO-1234yf, HFO-1234ze(E) or HFO-1234ze (Z) which has a high critical temperature and is excellent in the safety and cycle performance, and particularly preferred is HFO-1234yf.
<HFC-32>

In a case where the working fluid of the present invention contains HFC-32, with respect to the proportions of contents of HFO-1123 and HFC-32 based on the total amount of HFO-1123 and HFC-32 of 100 mass %, it is preferred that the proportion of HFO-1123 is from 10 to 99 mass % and the proportion of HFC-32 is from 90 to 1 mass %, more preferably the proportion of HFO-1123 is from 20 to 99 mass % and the proportion of HFC-32 is from 80 to 1 mass %, particularly preferably the proportion of HFO-1123 is from 25 to 99 mass % and the proportion of HFC-32 is from 75 to 1 mass %. Particularly a composition having a proportion of HFO-1123 of 90 mass % and a proportion of HFC-32 of 10 mass % has a very small difference in the composition ratio between gaseous and liquid phases and is an azeotropic composition and is thereby excellent in the stability.

Further, the total amount of HFO-1123 and HFC-32 is preferably at least 60 mass %, more preferably at least 70 mass % based on the total amount of the working fluid. The content of HFO-1123 is preferably at least 20 mass %, more preferably at least 40 mass % based on the total amount of the working fluid.
<HFO-1234yf>

In a case where the working fluid of the present invention contains HFO-1234yf, the proportion of the content of HFO-1123 based on the total amount of HFO-1123 and HFO-1234yf is preferably from 35 to 95 mass %, more preferably from 40 to 95 mass %, further preferably from 50 to 90 mass %, still more preferably from 50 to 85 mass %, most preferably from 60 to 85 mass %.

The total amount of HFO-1123 and HFO-1234yf based on the total amount of the working fluid is preferably at least 70 mass %, more preferably at least 80 mass %, further preferably at least 90 mass %, particularly preferably at least 95 mass %. The content of HFO-1123 is preferably at least 20 mass %, more preferably at least 40 mass % based on the total amount of the working fluid. When the total amount of HFO-1123 and HFO-1234yf is within the above range, the efficiency may be more increases while maintaining a certain performance when the working fluid is employed for heat cycle, whereby favorable cycle performance will be obtained.

Further, in a case where the working fluid of the present invention contains both HFC-32 and HFO-1234yf, the total amount of HFO-1123, HFC-32 and HFO-1234yf is preferably larger than 90 mass % based on the total amount of the working fluid. Further, based on the total amount of HFO-1123, HFC-32 and HFO-1234yf, it is preferred that the proportion of HFO-1123 is at least 20 mass % and less than 70 mass %, the proportion of HFC-32 is at least 30 mass % and at most 75 mass %, and the proportion of HFO-1234yf is at most 50 mass %. The proportion of HFO-1234yf is more preferably at most 40 mass %, most preferably 30 mass %.

By the proportions of the respective components such as HFO-1123 being within the above ranges, a working fluid which has practically sufficient cycle performance when used for heat cycle while suppressing influence over global warming, can be obtained.

<Other Components>

The working fluid of the present invention may contain other components in addition to HFO-1123, HFC-32, HFO-1234yf and the difluoroethylene. With respect to the content of such other components, the total amount of the difluoroethylene and such other components is preferably less than 1.5 mass %, more preferably at most 1.4 mass %, based on the total amount of the working fluid of 100 mass %.

Such other components are impurities (including impurities in the materials, intermediate products, by-products, etc., the same applies hereinafter) contained in a composition (for example, an outlet gas from a reactor, the same applies hereinafter) formed in production of HFO-1123, impurities contained in a composition formed in production of HFC-32, and impurities contained in a composition formed in production of HFO-1234yf.

Of such other components, abbreviated names, chemical formulae and names of compounds are shown in Tables 1 and 2. In Tables 1 and 2, abbreviate names, chemical formulae and names of HFO-1123, difluoroethylene (HFO-1132a and HFO-1132), HFC-32 and HFO-1234yf are also shown.

TABLE 1

| Abbreviated names | Chemical formulae | Compound names |
|---|---|---|
| | $CH_4$ | Methane |
| | $CH_3CH_3$ | Ethane |
| | $CH_3CH_2CH_3$ | Propane |
| | $CH_3CH_2CH_2CH_3$ | Butane |
| | $CH_3CH(CH_3)CH_3$ | Isobutane |
| HCC-40 | $CH_3Cl$ | Chloromethane |
| HCC-30 | $CH_2Cl_2$ | Dichloromethane |
| CFC-12 | $CF_2Cl_2$ | Dichlorodifluoromethane |
| HCFC-22 | $CHF_2Cl$ | Chlorodifluoromethane |
| HFC-23 | $CHF_3$ | Trifluoromethane |
| HFC-32 | $CH_2F_2$ | Difluoromethane |
| HCFC-31 | $CH_2FCl$ | Chlorofluoromethane |

TABLE 1-continued

| Abbreviated names | Chemical formulae | Compound names |
|---|---|---|
| HFC-41 | $CH_3F$ | Fluoromethane |
| CFC-113 | $CCl_2FCF_2Cl$ | 1,1,2-trichloro-1,2,2-trifluoroethane |
| HCFC-123a | $CF_2ClCHFCl$ | 1,2-dichloro-1,1,2-trifluoroethane |
| HCFC-124 | $CHFClCF_3$ | 1-chloro-1,2,2,2-tetrafluoroethane |
| HCFC-124a | $CF_2ClCHF_2$ | 1-chloro-1,1,2,2-tetrafluoroethane |
| HFC-125 | $CHF_2CF_3$ | Pentafluoroethane |
| HCFC-133 | $CHFClCHF_2$ | 1-chloro-1,2,2-trifluoroethane |
| HCFC-133b | $CF_2ClCH_2F$ | 1-chloro-1,1,2-trifluoroethane |
| HFC-134 | $CHF_2CHF_2$ | 1,1,2,2-tetrafluoroethane |
| HFC-134a | $CF_3CH_2F$ | 1,1,1,2-tetrafluoroethane |
| HCFC-142 | $CH_2ClCHF_2$ | 2-chloro-1,1-difluoroethane |
| HCFC-142b | $CF_2ClCH_3$ | 1-chloro-1,1-difluoroethane |
| HFC-143 | $CHF_2CH_2F$ | 1,1,2-trifluoroethane |
| HFC-143a | $CF_3CH_3$ | 1,1,1-trifluoroethane |
| HFC-152a | $CHF_2CH_3$ | 1,1-difluoroethane |
| HCFC-225aa | $CHF_2CCl_2CF_3$ | 2,2-dichloro-1,1,3,3,3-pentafluoropropane |
| HCFC-225ca | $CF_3CF_2CHCl_2$ | 3,3-dichloro-1,1,1,2,2-pentafluoropropane |
| HCFC-225cb | $CClF_2CFl_2CHClF$ | 1,3-dichloro-1,1,2,2,3-pentafluoropropane |
| HFC-227ca | $CF_3CF_2CHF_2$ | 1,1,1,2,2,3,3-heptafluoropropane |
| HFC-227ea | $CF_3CHFCF_3$ | 1,1,1,2,3,3,3-heptafluoropropane |
| HFC-236fa | $CF_3CH_2CF_3$ | 1,1,1,3,3,3-hexafluoropropane |
| HFC-236ea | $CF_3CHFCHF_2$ | 1,1,1,2,3,3-hexafluoropropane |
| HCFC-244bb | $CF_3CClFCH_3$ | 2-chloro-1,1,1,2-tetrafluoropropane |
| HFC-245cb | $CF_3CF_2CH_3$ | 1,1,1,2,2-pentafluoropropane |
| HFC-245eb | $CF_3CHFCH_2F$ | 1,1,1,2,3-pentafluoropropane |
| HFC-254eb | $CF_3CHFCH_3$ | 1,1,1,2-tetrafluoropropane |

TABLE 2

| Abbreviated names | Chemical formulae | Compound names |
|---|---|---|
| | $CH_2=CH_2$ | Ethylene |
| | $CH_2CH=CH_2$ | Propylene |
| | $CH_2=CHCH_2CH_3$ | 1-normalbutene |
| | $CH_3CH=CHCH_3$ | 2-normalbutene |
| | $CH_2=C(CH_3)_2$ | Isobutene |
| CFO-1112 | $CFCl=CFCl$ | E- and/or Z-1,2-dichloro-1,2-difluoroethylene |
| CFO-1113 | $CF_2=CFCl$ | Chlorotrifluoroethylene (CTFE) |
| FO-1114 | $CF_2=CF_2$ | Tetrafluoroethylene (TFE) |
| HCFO-1122 | $CF_2=CHCl$ | 1-chloro-2,2-difluoroethylene |
| HCFO-1122a | $CFCl=CHF$ | E- and/or Z-1-chloro-1,2-difluoroethylene |
| HFO-1123 | $CF_2=CHF$ | Trifluoroethylene |
| HCFO-1131 | $CHF=CHCl$ | E- and/or Z-1-chloro-2-fluoroethylene |
| HFO-1132 | $CHF=CHF$ | E- and/or Z-1,2-difluoroethylene |
| HFO-1132a | $CF_2=CH_2$ | 1,1-difluoroethylene (VdF) |
| HFO-1141 | $CHF=CH_2$ | Fluoroethylene |
| CFO-1214ya | $CF_3CF=CCl_2$ | 1,1-dichloro-3,3,3,2-tetrafluoropropene |
| FO-1216 | $CF_3CF=CF_2$ | Hexafluoropropene |
| HCFO-1224yd | $CF_3CF=CHCl$ | 1-chloro-2,3,3,3-tetrafluoropropene |
| HFO-1225zc | $CF_3CH=CF_2$ | 1,1,3,3,3-pentafluoropropene |
| HFO-1225ye | $CF_3CF=CHF$ | 1,2,3,3,3-pentafluoropropene |
| HCFO-1233xf | $CF_3CCl=CH_2$ | 2-chloro-3,3,3-trifluoropropene |
| HFO-1234yf | $CF_3CF=CH_2$ | 2,3,3,3-tetrafluoropropene |
| HFO-1234ze | $CF_3CH=CHF$ | E- and/or Z-1,3,3,3-tetrafluoropropene |
| HFO-1243zf | $CF_3CH=CH_2$ | 3,3,3-trifluoropropene |
| HFO-1252zf | $CHF_2CH=CH_2$ | 3,3-difluoropropene |
| RC318 | $-(CF_2CF_2CF_2CF_2)-$ | Perfluorocyclobutane |

Now, processes for producing HFO-1123, HFC-32 and HFO-1234yf and impurities contained in compositions obtained in their production will be described.

<Production of HFO-1123>

As a process for producing HFO-1123, for example, three processes of (I) hydrogen reduction of chlorotrifluoroethylene (CTFE) (CFO-1113), (II) synthesis involving heat decomposition of chlorodifluoromethane (HCFC-22) and chlorofluoromethane (HCFC-31) and (III) catalytic reaction of 1,1,1,2-tetrafluoroethane (HFC-134a) and a solid reactant may be mentioned.

(I) Hydrogen Reduction of CFO-1113

CFO-1113 and hydrogen are reacted in a gaseous phase in a reactor having a catalyst layer filled with a catalyst-supporting carrier to form a gas containing HFO-1123.

In this process, a reaction represented by the following reaction formula is carried out in the reactor.

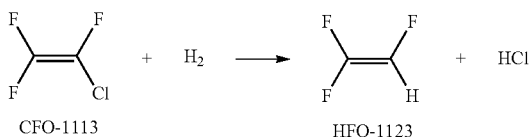

With respect to the ratio of CFO-1113 and hydrogen in a material composition, the proportion of hydrogen is within a range of from 0.01 to 4.0 mol per 1 mol of CFO-1113. The pressure in the reactor is preferably ordinary pressure in view of the handling efficiency. The catalyst is preferably a palladium catalyst, and the palladium catalyst is supported on a carrier such as activate carbon. In order to carry out gaseous phase reaction, the temperature of the catalyst layer is a temperature of at least the dew point of the material composition (gas mixture) containing CFO-1113 and hydrogen. It is preferably within a range of from 220° C. to 240° C. The time of contact of CFO-1113 as the material compound and the catalyst is preferably from 4 to 60 seconds.

In such hydrogen reduction of CFO-1113, a composition containing HFO-1123 can be obtained as an outlet gas of the reactor. Compounds other than HFO-1123 contained in the outlet gas may, for example, be CFO-1113 as the unreacted material, and HFO-1132, HFO-1132a, HCFO-1122, HCFO-1122a, HFC-143, methane, HFC-152a, HCFC-142, HCFC-142b, HCFC-133, HCFC-133b, HCFC-123a, CFC-113 and CFO-1112.

(II) Synthesis Involving Heat Decomposition of HCFC-22 and HCFC-31

HFO-1123 is produced by a synthetic reaction involving heat decomposition using a material composition containing HCFC-22 and HCFC-31 in the presence of a heating fluid.

In this production process, HCFC-22 and HCFC-31 in a molar ratio of 1:0.01 to 4.0 are supplied to a reactor as preliminarily mixed or separately and allowed to stay in the reactor, and the heating fluid is supplied to the reactor and brought into contact with the material composition in the reactor. The temperature in the reactor is preferably from 400 to 1,200° C.

The main reaction in the reactor in this production process is shown in the following formula:

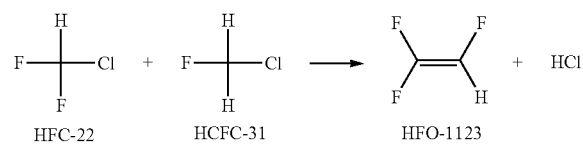

The material composition may be introduced into the reactor at ordinary temperature or may be preliminarily heated and then introduced to the reactor so as to increase the reactivity in the reactor. The temperature of HCFC-31 to be supplied to the reactor is preferably from 0 to 600° C., and the temperature of HCFC-22 is preferably at least ordinary temperature (25° C.) and at most 600° C.

The heating fluid is a medium which does not undergo heat decomposition at the temperature in the reactor, and is preferably a gas containing water vapor in an amount of at least 50 vol % and containing nitrogen and/or carbon dioxide as the rest. The amount of supply of the heating fluid is preferably from 20 to 98 vol % based on the total amount of the heating fluid and the material composition supplied. The time of contact of the heating fluid and the material composition in the reactor is preferably from 0.01 to 10 seconds, and the pressure in the reactor is preferably from 0 to 2.0 MPa by the gauge pressure.

By such synthesis involving heat decomposition of HCFC-22 and HCFC-31, a composition containing HFO-1123 can be obtained as an outlet gas of the reactor. Compounds other than HFO-1123 contained in the outlet gas may, for example, be HCFC-22 and HCFC-31 as the unreacted materials, and HFO-1132, HFO-1132a, HFO-1141, CFO-1113, HCFO-1122, HCFO-1122a, HFC-143, FO-1114, HCFO-1131, HFO-1252zf, HFO-1243zf, HFO-1234yf, HFO-1234ze, FO-1216, HFC-125, HFC-134, HFC-134a, HFC-143a, HCFC-124, HCFC-124a, HFC-227ca, HFC-227ea, HFC-236fa, HFC-236ea, CFC-12, HFC-23, HFC-32, HFC-41, HCC-40, RC-318 and methane.

(III) Catalytic Reaction of HFC-134a and Solid Reactant

A material gas containing HFC-134a and a solid reactant are contacted in a reactor to form a composition (gas) containing HFO-1123. The solid reactant may, for example, be calcium oxide in the form of particles.

The main reaction in the reactor in this process is shown in the following formula:

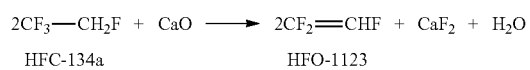

The content of HFC-134a in the material gas (100 mol %) is preferably from 5 to 100 mol %. Further, the temperature in the reactor is preferably from 200 to 500° C., and the pressure is preferably from 0 to 2 MPa by the gauge pressure.

Further, particularly, a solid reactant (for example, potassium carbonate and/or calcium oxide) in the form of particles having a predetermined average particle size (1 μm to 5,000 μm) may be used, a material gas containing HFC-134a is made to flow through a layer of the solid reactant to bring HFC-134a into contact with the solid reactant in a state where the solid reactant layer is fluidized. In this embodiment, the temperature at which HFC-134a is contacted with the solid reactant is preferably within a range of from 100° C. to 500° C.

In such catalytic reaction of HFC-134a and the solid reactant, a composition containing HFO-1123 may be obtained as an outlet gas of the reactor. Compounds other than HFO-1123 and the unreacted material component (HFC-134a) contained in the outlet gas may, for example, be hydrogen fluoride, E/Z-HFO-1132, HFO-1132a, HFC-143, HFC-143a, methane, ethane, ethylene, propane, propylene, butane, isobutane, 1-n-butene, 2-n-butene, isobutene, HFO-1141, HFO-1252zf, HFO-1243zf, HFO-1234yf, E/Z-HFO-1234ze, FO-1216, HFC-125, HFC-134, HFC-143a, HFC-227ca, HFC-227ea, HFC-236fa, HFC-236ea, HFC-32, HFC-23 and HFC-41.

As described above, in the respective processes for producing HFO-1123, in addition to HFO-1123, the above difluoroethylene compound (HFO-132a and/or HFO-132) and various compounds are present as impurities in a formed composition such as an outlet gas from the reactor. Compounds other than the difluoroethylene compound, HFC-32 and HFO-1234yf in the impurities are the above-mentioned first compounds.

<Production of HFC-32>

As a process for producing HFC-32, a process of subjecting dichloromethane (HCC-30) and hydrogen fluoride to a gaseous phase reaction at a temperature of from 200 to 500° C. using an aluminum fluoride catalyst, a catalyst formed by mixing and forming aluminum fluoride with a carrier, or a catalyst having chromium fluoride supported on a carrier, may be mentioned. By this process, an outlet gas of the reactor contains the desired HFO-32 and HFC-31 as well, and further contains the unreacted HCC-30.

Further, as another process for producing HFC-32, a process of reacting HCC-30 and hydrogen fluoride in a liquid phase in the presence of a fluorinated catalyst such as a mixture of antimony pentafluoride and antimony trifluoride, or antimony pentafluoride at a predetermined concentration (at a temperature of from 80 to 150° C., under a pressure of from 8 to 80 kg/cm²) may be mentioned. By this process, in addition to HFC-32, HFC-31, HFC-23 and HCC-40 will form as impurities.

As mentioned above, in the respective processes for producing HFC-32, HCC-30, HFC-31, HFC-23 and HCC-40 will form as impurities. Such impurities are the above-mentioned first compounds.

<Production of 1234yf>

As a process for producing HFO-1234yf, (i) a process of using an isomeric mixture of (i) dichloropentafluoropropane (HCFC-225) (225 process), (ii) a process using hexafluoropropene (FO-1216) as a material compound (HFP process), (iii) a process of using 1,1,2,3-tetrachloropropene (HCC-1230) as a starting material (TCP process) and (iv) a process of subjecting a material composition into a synthesis reaction involving heat decomposition in the presence of a heating fluid may, for example, be mentioned.

(i) 225 Process

HFO-1234yf is produced using an isomeric mixture of HCFC-225. In this process, as shown in the following reaction path, 1,1-dichloro-2,2,3,3,3-pentafluoropropane (HCFC-225ca) in the material is selectively subjected to dehydrofluorination to produce 1,1-dichloro-2,3,3,3-tetrafluoropropene (CFO-1214ya), and the obtained CFO-1214ya is reduced to produce HFO-1234yf.

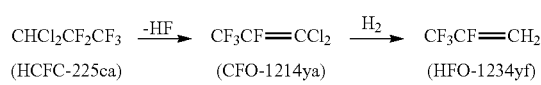

In this production process, as impurities obtained in addition to HFO-1234yf, the following compounds may be mentioned. That is, as impurities contained in the material, HCFC-225ca, and its isomers HCFC-225cb and HCFC-225aa may, for example, be mentioned. Further, intermediate products CFO-1214ya and HCFO-1224yd may, for example, be mentioned. Further, as by-products, HFC-254eb which is a reduced form of HCFC-225ca, HFO-1225zc obtained by dehydrochlorination and then reduction of HCFC-225aa, HFO-1243zf which is an over-reduced form of HFO-1234yf, and HFO-1252zf may, for example, be mentioned.

(ii) HFP Process

HFO-1234yf is produced using FO-1216 (PFO-1216yc) as a material compound in accordance with the following reaction path:

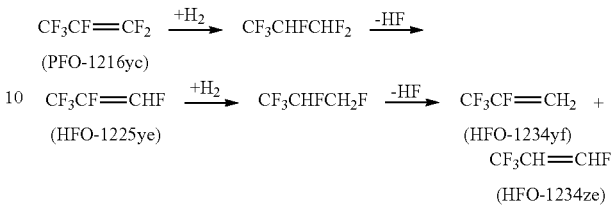

In this production process, as impurities obtained in addition to HFO-1234yf, FO-1216, HFO-1225ye and HFO-1234ze may, for example, be mentioned.

Further, HFO-1234yf may be produced using 1,2,3-trichloropropane as the material compound in accordance with the following reaction path. In this production process, HFC-245cb is an organic impurity.

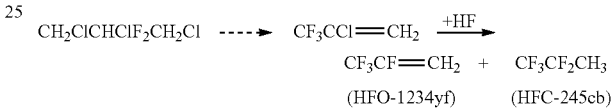

(iii) TCP Process

HFO-1234yf is produced using HCC-1230 as a starting material. That is, in accordance with the following reaction path, HCC-1230 is fluorinated with hydrogen fluoride to form 2-chloro-3,3,3-trifluoropropene (HCFO-1233xf), then HCFO-1233xf is reacted with hydrogen fluoride to form 2-chloro-1,1,1,2-tetrafluoropropane (HCFC-244bb), and further HCFC-244bb is subjected to dehydrohalogenation to form HFO-1234yf.

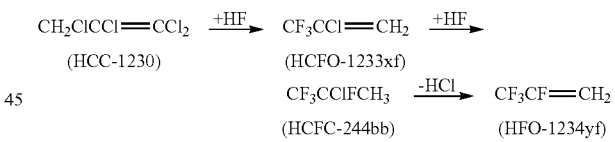

In this production process, HCFO-1233xf, HCFC-244bb, HFO-1234ze, HFO-1243zf, 1,1,1,2,3-pentafluoropropane (HFC-245eb) and the like form as impurities.

(iv) Synthesis Involving Heat Decomposition

HFO-1234 yf is produced by a synthetic reaction involving heat decomposition from a material composition in the presence of a heating fluid. As the heating fluid, water vapor, nitrogen, carbon dioxide or the like is used. Preferred is a gas containing water vapor in an amount of at least 50 vol % and containing nitrogen and/or carbon dioxide as the rest.

As the material composition, a compound which may be decomposed by contact with the heating fluid in a reactor to form difluorocarbene (F₂C:) and chloromethane or methane are used as mixed.

Specifically, a material composition containing compounds of the following (iv-1) to (iv-6) is used. And, compounds shown in each section, in addition to HFO-1234yf and the unreacted material components, are obtained as components (impurities) of an outlet gas from the reactor.

(iv-1) HCFC-22 and HCC-40

HCFC-22 and HCC-40 are supplied to a reactor as mixed in a predetermined ratio or separately, and further, the heating fluid is supplied to the reactor and brought into contact with the material composition containing HCFC-22 and HCC-40 in the reactor to carry out a synthetic reaction involving heat decomposition thereby to form HFO-1234yf and HFO-1132a. The temperature in the reactor is from 400 to 1,200° C. The main reaction in the reactor is shown in the following formula:

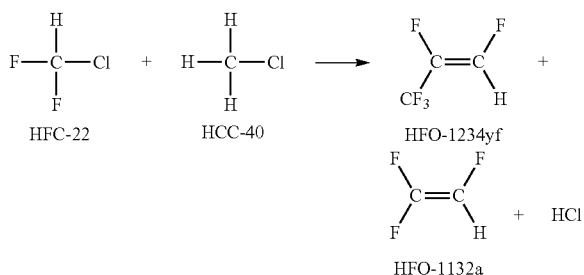

Compounds other than HFO-1234yf, HFO-1132a and the unreacted material components contained in the outlet gas of the reactor may, for example, be methane, ethylene, FO-1114, FO-1216, CFO-1113, HFO-1123, RC-318, HFO-1234ze) and HFO-1132.

(iv-2) HCFC-22, HCC-40 and FO-1114

HCFC-22, HCC-40 and FO-1114 are supplied to a reactor as preliminarily mixed or separately and allowed to stay in the reactor for a predetermined time, the heating fluid is supplied to the reactor and brought into contact with the material composition in the reactor. And, by a synthetic reaction involving heat decomposition, HFO-1234yf and HFO-1132a are formed. The temperature in the reactor is from 400 to 1,200° C. The main reaction in the reactor is shown in the following formula.

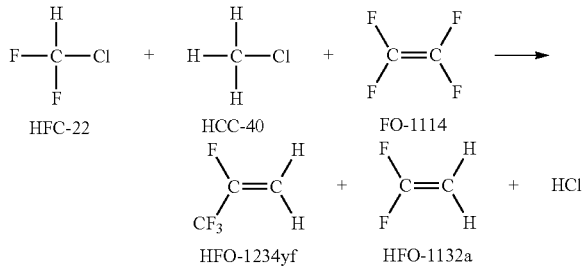

Compounds other than HFO-1234yf, HFO-1132a and the unreacted material components contained in an outlet gas of the reactor, may, for example, be methane, ethylene, FO-1114, FO-1216, CFO-1113, HFO-1123, RC318 and HFO-1243zf.

(iv-3) R318 and HCC-40

HFO-1234yf and HFO-1132a are produced by a synthetic reaction involving heat decomposition from a material composition containing R318 and HCC-40 in the presence of a heating fluid. Compounds other than HFO-1234yf, HFO-1132a and the unreacted material components contained in an outlet gas of the reactor may, for example, be methane, ethylene, HFC-22, FO-1114, FO-1216, CFO-1113, HFO-1123, HFO-1234ze and HFO-1132.

(iv-4) FO-1216 and HCC-40

HFO-1234yf and HFO-1132a are produced by synthetic reaction involving heat decomposition from a material composition containing FO-1216 and HCC-40 in the presence of a heating fluid. Compounds other than HFO-1234yf, HFO-1132a and the unreacted material components contained in an outlet gas of the reactor may, for example, be methane, ethylene, HFC-22, HFC-23, FO-1114, FO-1216, CFO-1113, RC318, HFO-1123, HFO-1234ze and HFO-1132.

(iv-5) HFC-22 and/or FO-1114 and Methane

HFO-1234yf and HFO-1132a are produced by a synthetic reaction involving heat decomposition from a material composition containing HFC-22 and/or FO-1114 and methane in the presence of a heating fluid. Compounds other than HFO-1234yf, HFO-1132a and the unreacted material components contained in an outlet gas of the reactor, may, for example, be methane, ethylene, FO-1114, FO-1216, CFO-1113, RC318, HFO-1123 and HFO-1243zf.

(iv-6) FO-1114 and HCC-40

HFO-1234yf is produced by a synthetic reaction involving heat decomposition from a material composition containing FO-1114 and HCC-40 in the presence of a heating fluid. The temperature in the reactor to which the material composition and the heating fluid are supplied is from 400 to 870° C. Compounds other than HFO-1234yf and the unreacted material components contained in an outlet gas of the reactor may, for example, be methane, ethylene, FO-1216, CFO-1113, RC318, HFO-1132a, HFO-1123 and HFO-1243zf.

As described above, the working fluid of the present invention, which may contain other components, is produced with high productivity as a working fluid.

The working fluid of the present invention has less influence over the ozone layer, has less influence over global warming, and is excellent in cycle performance, and is thereby useful as a working fluid for heat cycle system. The heat cycle system may, for example, be specifically refrigerating equipment, air-conditioning equipment, power generation system, a heat transfer apparatus and a secondary cooling machine.

The air-conditioning equipment may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerating equipment may, for example, be specifically a showcase (such as a built-in showcase or a separate showcase, an industrial fridge freezer, a vending machine or an ice making machine.

The power generation system may, for example, be a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

The heat transport apparatus is preferably a latent heat transport apparatus. The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

EXAMPLES

Now, the present invention will be described in further detail with reference to Examples. However, it should be understood that the present invention is by no means restricted to such specific Examples. Ex. 1 to 3, 5, 7 and 9 are Examples of the present invention, and Ex. 4, 6, 8 and 10 are Comparative Examples.

Ex. 1 to 10

A working fluid containing HFO-1123, and HFC-32 and/or HFO-1234yf in a proportion as identified in Table 3 and containing HFO-1132a in a proportion as identified in Table 3 based on the working fluid, was prepared. Of the working fluid, refrigerating cycle performance (hereinafter referred to as refrigerating capacity Q) was measured by the following method.

The refrigerating capacity Q means a capacity to cool a load fluid, and a higher refrigerating capacity Q means that more works can be done in the same system. In other words, it means that with a working fluid having a larger refrigerating capacity Q, the desired performance can be obtained with a smaller amount, whereby the system can be downsized.

[Measurement of the Refrigerating Capacity Q]

Figure 2:
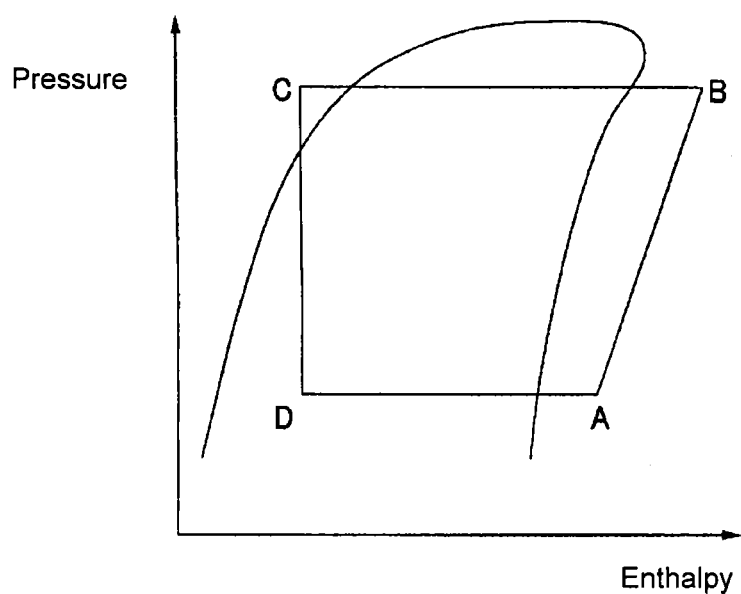
FIG. 2 is a cycle diagram illustrating the state change of a working fluid in the refrigerating cycle system in FIG. 1 on a pressure-enthalpy chart.

Measurement of the refrigerating capacity Q was carried out with respect to a case where a working fluid was applied to a refrigerating cycle system 10 as shown in FIG. 1 and a heat cycle shown in FIG. 2, i.e. adiabatic compression by a compressor 11 in the AB process, isobaric cooling by a condenser 12 in the BC process, isenthalpic expansion by an expansion valve 13 in the CD process and isobaric heating by an evaporator 14 by the DA process were carried out.

The refrigerating cycle system 10 shown in FIG. 1 comprises a compressor 11 to compress a working fluid (vapor), a condenser 12 to cool and liquefy the working fluid vapor discharged from the compressor 11, an expansion valve 13 to let the working fluid (liquid) discharged from the condenser 12 expand, and an evaporator 14 to heat and vaporize the working fluid liquid discharged from the expansion valve 13. In this refrigerating cycle system 10, the temperature of the working fluid increases from an inlet toward an outlet of the evaporator 14 at the time of evaporation, and on the contrary, the temperature of the working fluid decreases from an inlet toward an outlet of the condenser 12 at the time of condensation. In the refrigerating cycle system 10, in the evaporator 14 and the condenser 12, such is achieved by heat exchange between the working fluid and a heat source fluid such as water or the air flowing to face the working fluid. The heat source fluid is represented, in the refrigerating cycle system 10, by "E→E" in the evaporator 14 and by "F→F" in the condenser 12.

As the measurement conditions, the average evaporation temperature of the working fluid in the evaporator 14 was 0° C., the average condensing temperature of the working fluid in the condenser 12 was 40° C., the supercooling degree (SC) of the working fluid in the condenser 12 was 5° C., and the degree of superheat (SH) of the working fluid in the evaporator 14 was 5° C.

In the evaporator, a fluorinated brine (ASAHIKLIN AE-3000: manufactured by Asahi Glass Company, Limited) was used as the heat source fluid, and from the temperature and the flow amount of the heat source fluid before and after heat exchange in the evaporator 14, the refrigerating capacity Q of the working fluid was obtained.

The results of evaluation of the refrigerating capacity Q are shown in Table 3, based on evaluation standards ⊚ (excellent): the relative capacity of 1 or higher based on the refrigerating capacity Q of 1 at a content of HFO-1132a of 0 ppm in each working fluid composition, ○ (good): 0.9 to 1, Δ (fair): 0.7 to 0.9, and X (poor): less than 0.7.

TABLE 3

|  | Component | Proportion of content (mass %) based on working fluid | | Proportion of content (mass %) of HFO-1132a based on working fluid | Refrigerating capacity |
| --- | --- | --- | --- | --- | --- |
|  |  | HFO-1123 | HFC-32 or HFO-1234yf |  |  |
| Ex. 1 | HFO-1123/HFC-32/HFO-1132a | 59.9 | 40 | 0.1 | ⊚ |
| Ex. 2 | HFO-1123/HFC-32/HFO-1132a | 59.5 | 40 | 0.5 | ○ |
| Ex. 3 | HFO-1123/HFC-32/HFO-1132a | 59 | 40 | 1.0 | Δ |
| Ex. 4 | HFO-1123/HFC-32/HFO-1132a | At most 58.5 | 40 | At least 1.5 | X |
| Ex. 5 | HFO-1123/HFC-32/HFO-1132a | 39.5 | 60 | 0.5 | ○ |
| Ex. 6 | HFO-1123/HFC-32/HFO-1132a | At most 38.5 | 60 | At least 1.5 | X |
| Ex. 7 | HFO-1123/HFO-1234yf/HFO-1132a | 59.5 | 40 | 0.5 | ○ |
| Ex. 8 | HFO-1123/HFO-1234yf/HFO-1132a | At most 58.5 | 40 | At least 1.5 | X |
| Ex. 9 | HFO-1123/HFO-1234yf/HFO-1132a | 59.5 | 60 | 0.5 | ○ |
| Ex. 10 | HFO-1123/HFO-1234yf/HFO-1132a | At most 58.5 | 60 | At least 1.5 | X |

It is found from Table 3 that the working fluids in Ex. 1 to 3, 5, 7 and 9 containing HFO-1123, HFC-32 and/or HFO-1234yf, and HFO-1132a, and having a proportion of the content of HFO-1132a based on the working fluids of less than 1.5 mass %, are excellent in the refrigerating capacity Q. Whereas the working fluid in Ex. 4, 6, 8 and 10 having a proportion of the content of HFO-1132a based on the working fluid of at least 1.5 mass % are inferior in the refrigerating capacity Q.

INDUSTRIAL APPLICABILITY

The working fluid for heat cycle of the present invention is useful for refrigerating equipment (such as a built-in showcase, a separate showcase, an industrial fridge freezer, a vending machine and an ice making machine), air-conditioning equipment (such as a room air-conditioner, a store package air-conditioner, a building package air-conditioner, a plant package air-conditioner, a gas engine heat pump, a train air-conditioning system and an automobile air-conditioning system), a power generation system (such as exhaust heat recovery power generation) and a heat transport apparatus (such as a heat pipe).

This application is a continuation of PCT Application No. PCT/JP2014/061767, filed on Apr. 25, 2014, which is based upon and claims the benefit of priority from Japanese Patent Application No. 2013-095491 filed on Apr. 30, 2013 and Japanese Patent Application No. 2014-030855 filed on Feb. 20, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump

What is claimed is:

1. A working fluid for heat cycle, comprising
trifluoroethylene, 1,1-difluoroethylene, and difluoromethane,
wherein a proportion of 1,1-difluoroethylene is less than 1.5 mass % based on an entire amount of the working fluid.

2. The working fluid according to claim 1, wherein a proportion of trifluoroethylene is at least 20 mass % based on the entire amount of the working fluid.

3. The working fluid according to claim 1, further comprising
a hydrofluoroolefin.

4. The working fluid according to claim 3, wherein the hydrofluoroolefin is 2,3,3,3-tetrafluoropropene.

5. A working fluid for heat cycle, comprising
trifluoroethylene, 1,1-difluoroethylene, and difluoromethane,
wherein a proportion of 1,1-difluoroethylene is less than 1.5 mass % based on an entire amount of the working fluid, and a total proportion of trifluoroethylene and difluoromethane is at least 80 mass % based on the entire amount of the working fluid.

6. The working fluid according to claim 5, wherein a proportion of trifluoroethylene is at least 20 mass % based on the entire amount of the working fluid.

7. A working fluid for heat cycle, comprising
trifluoroethylene, 1,1-difluoroethylene, difluoromethane, and 2,3,3,3-tetrafluoropropene,
wherein a proportion of 1,1-difluoroethylene is less than 1.5 mass % based on an entire amount of the working fluid, and a total proportion of trifluoroethylene and 2,3,3,3-tetrafluoropropene is at least 70 mass % based on the entire amount of the working fluid.

8. The working fluid according to claim 7, wherein a proportion of trifluoroethylene is at least 20 mass based on the entire amount of the working fluid.

9. A working fluid for heat cycle, comprising
trifluoroethylene, 1,1-difluoroethylene, difluoromethane and 2,3,3,3-tetrafluoropropene,
wherein a proportion of 1,1-difluoroethylene is less than 1.5 mass % based on an entire amount of the working fluid.

10. The working fluid according to claim 9, wherein a proportion of trifluoroethylene is at least 20 mass % and less than 70 mass %, a proportion of difluoromethane is at least 30 mass % and at most 75 mass %, and a proportion of 2,3,3,3-tetrafluoropropene is at most 50 mass %, based on the entire amount of the working fluid.

* * * * *